Patented Apr. 26, 1932

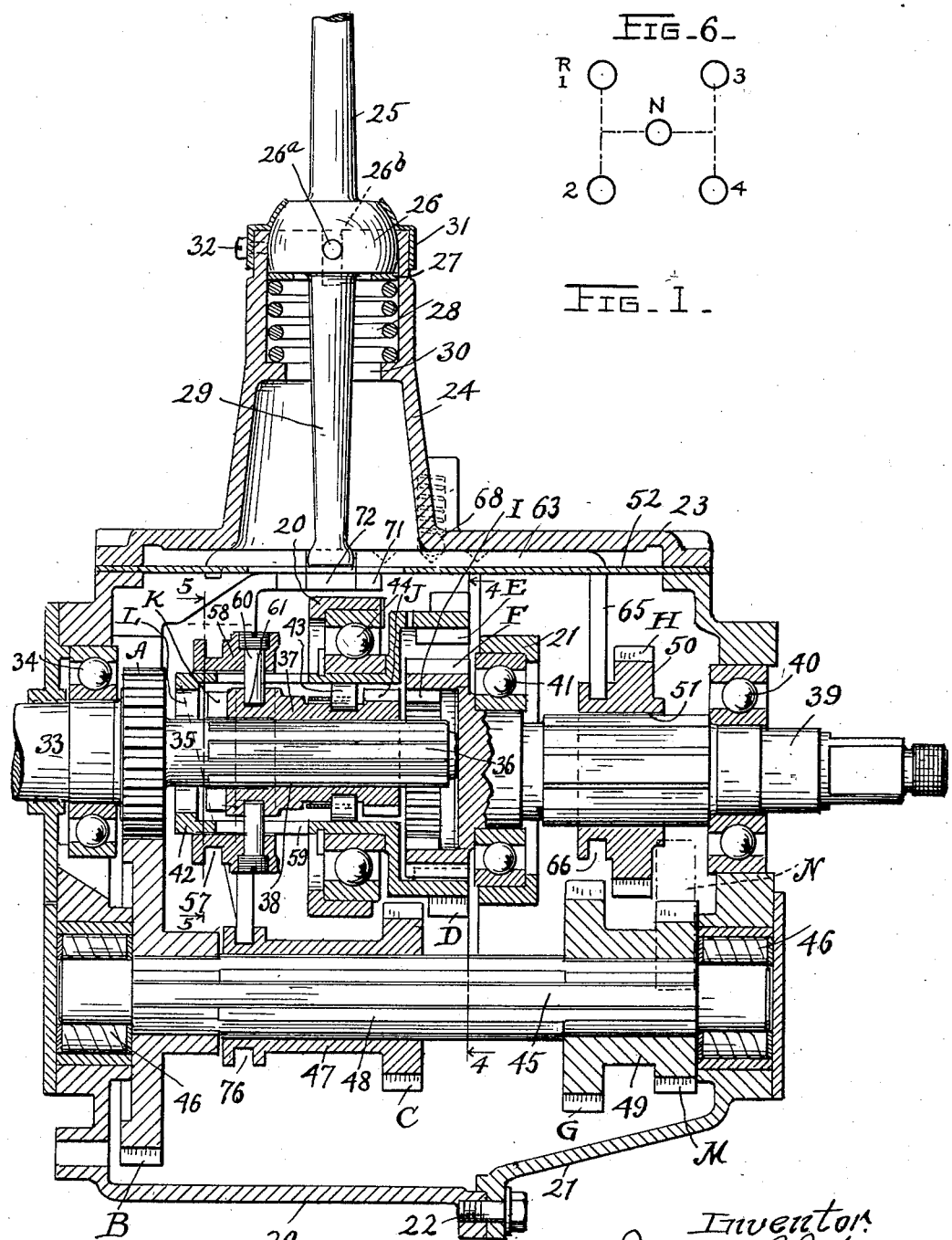

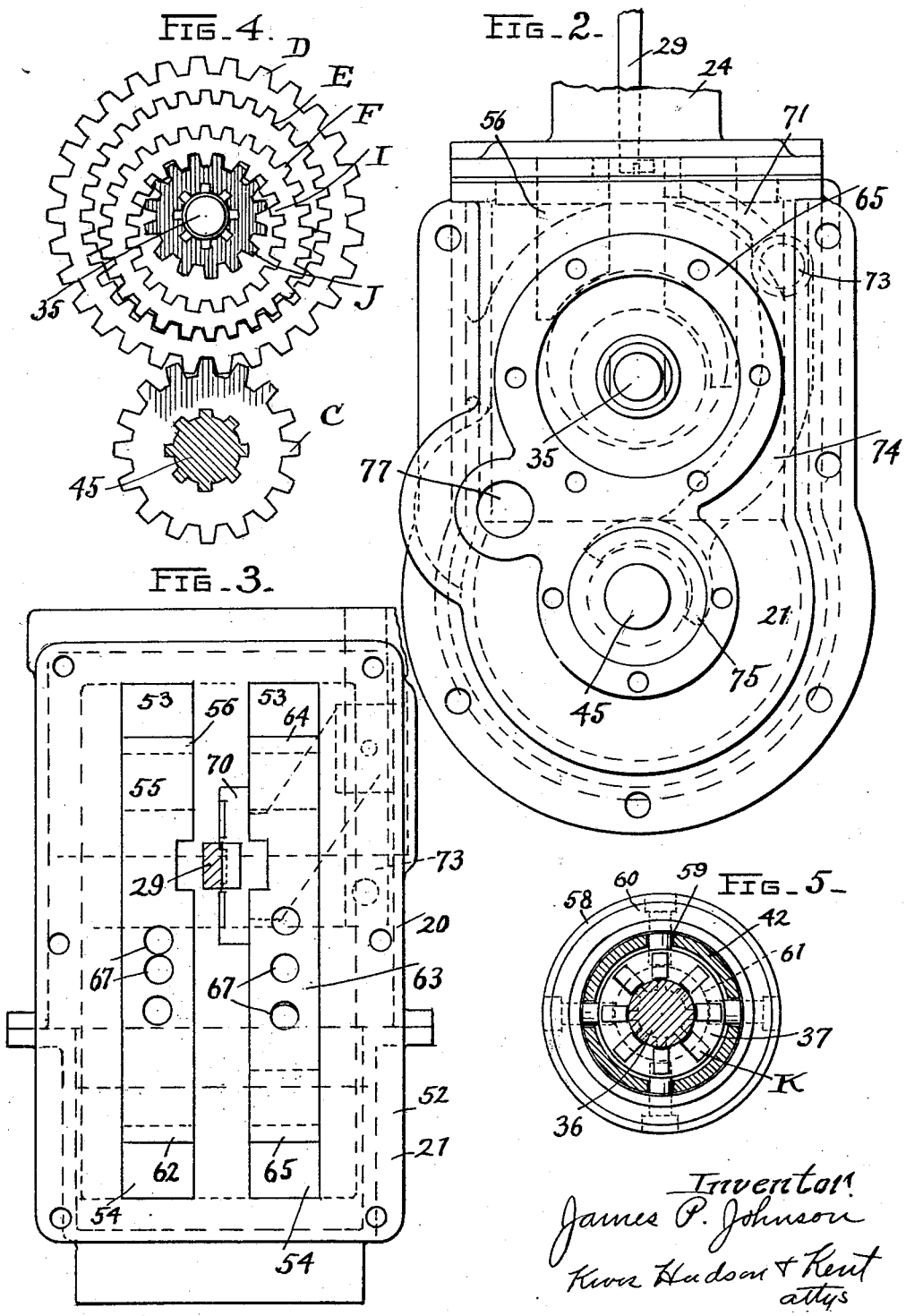

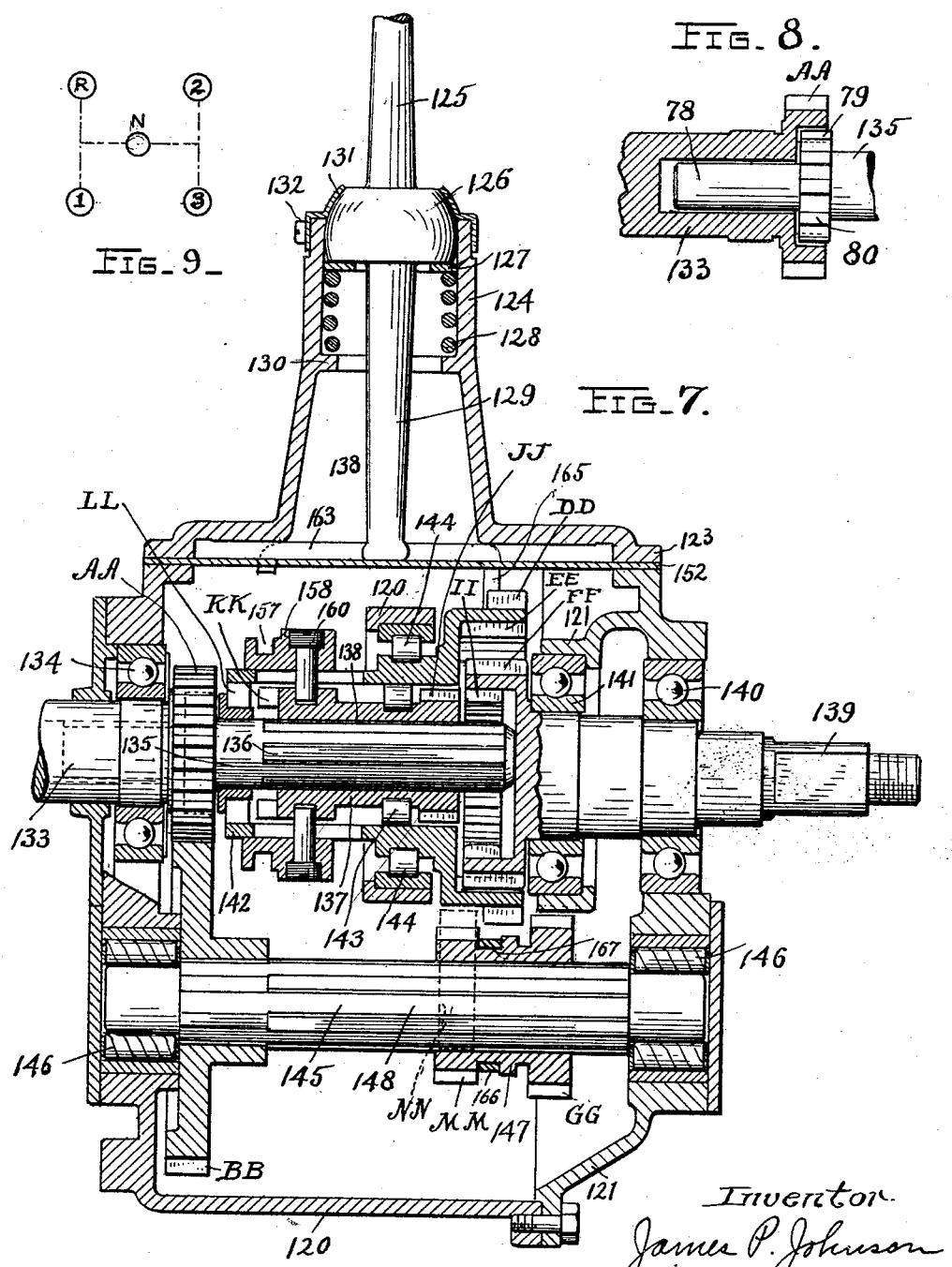

1,855,680

UNITED STATES PATENT OFFICE

JAMES P. JOHNSON, OF CLEVELAND HEIGHTS, OHIO, ASSIGNOR TO THE J. P. JOHNSON ENGINEERING COMPANY, OF CLEVELAND, OHIO, A CORPORATION OF OHIO

VARIABLE SPEED GEARING

Application filed October 28, 1927. Serial No. 229,293.

This invention relates to transmission gearing for motor vehicles and particularly to a type of transmission including what is commonly termed "two quiet high speeds" at which the motor vehicle is propelled, the highest of the two quiet speeds being adaptable for open or country driving, where the latter is relatively level, and the lowest of the two quiet high speeds being adaptable for propelling the motor vehicle in city traffic where acceleration is desirable or for propelling the motor vehicle over hilly country. One of the important features of the present invention, in connection with the two quiet high speeds, resides in the provision of a constantly meshing internal and external gear and means for rotating the driven shaft at various speed ratios, with respect to and from the drive shaft.

Another object of the invention is the provision of a transmission for motor vehicles employing two quiet high speeds and utilizing the present recognized standard gear shift, this being a material advantage and improvement over the present types of four speeds and forward reverse transmissions.

A still further object of the invention is to provide a novel arrangement of the parts constituting the transmission mechanism in which the transmission as a unit is maintained as small as possible as compared with the standard types of three speed transmissions, one which is efficient and simple in operation and one in which the manufacturing costs are maintained at a minimum.

Another object of the invention is to provide a low speed ratio in the transmission and novel means for shifting the mechanism so as to rotate the driven shaft from the drive shaft through the low speed gearing.

With the objects above indicated and other objects hereinafter explained in view, my invention consists in the construction and combination of elements hereinafter described and claimed.

In the drawings, Fig. 1 is a longitudinal sectional view of a transmission embodying my present invention;

Fig. 2 is a rear end elevational view of the transmission shown in Fig. 1;

Fig. 3 is a top plan view of the transmission shown in Fig. 1, but with the cover plate removed;

Fig. 4 is a transverse sectional view taken on line 4—4 of Fig. 1 showing the arrangement and co-operation of the various gears;

Fig. 5 is a cross-sectional view taken in line 5—5 of Fig. 1;

Fig. 6 is a diagrammatic view illustrating the shift employed in connection with the transmission gearing, shown in Fig. 1;

Fig. 7 is a modified arrangement of the transmission from that shown in Fig. 1;

Fig. 8 shows a modified driving connection between the drive shaft and the extension; and Fig. 9 shows a diagrammatic view illustrating the shift employed in connection with the transmission gearing shown in Fig. 7.

In the drawings, the transmission housing is indicated by 20, which is of usual cast iron construction having at the rear portion thereof an auxiliary housing 21 suitably connected to a flange on the housing 20 by bolts 22.

At the upper portion of the housing 20 and auxiliary housing 21 is a cover 23 suitably connected thereto by bolts or other means, the said cover 23 being provided with an integral tubular extension 24 adapted to receive and support at its upper end the shifting lever 25.

The shifting lever 25 is provided near its lower end with a substantially cylindrical portion or enlargement 26, the lower surface of which engages a bearing plate 27 in engagement with a coil spring 28 encircling the arm 29, which is substantially a continuation of the shift lever 25, while the lower portion of the spring 28 abuts an annular flange 30 provided integral with the inner walls of the tubular extension 24. This spring functions to retain the shifting lever 25 in its normal elevated position and to limit the upward movement of the shift lever 25 a cap 31 is secured to the end of the tubular extension 24 by screws 32, or any other suitable means, the cap 31 being adapted to engage a portion of the cylindrical member 26. A pin 26a is carried by the shifting lever 25 and is adapted to move vertically in a slot 26b in the extension 24 which limits the downward movement of the lever 25.

In the front end of the housing 20 a drive shaft 33 is rotatably mounted in bearings 34 supported within an opening in the housing in such a manner to permit the free rotation of the drive shaft 33. The drive shaft 33 has a reduced end portion extending inwardly into the housing 20, and between the main portion of the drive shaft 33 and the reduced extension 35 is an external gear A, for a purpose to be later described.

The reduced extension 35 is provided with a plurality of longitudinally extending splines 36 spaced preferably equally circumferentially thereof. Supported by the reduced extension 35 is a slidable member 37 having splines 38 co-operating with the splines 36 of the reduced extension in such a manner as to permit free sliding movement of the member 37, but at the same time prevent its relative rotation with respect to the reduction extension 35. This slidable member 37 is provided at one end with a plurality of longitudinally extending clutch members K and at its opposite end with an external gear J having any desired number of teeth.

In the rear end of the auxiliary housing 21 is a driven shaft 39 rotatably supported in bearings 40 fixed within a suitable opening in the end of the auxiliary housing 21 to thereby afford free and easy rotation of the driven shaft 39. This driven shaft 39 extends inwardly a suitable distance within the housing 20 and is provided upon its inner end with an internal gear I which is adapted to engage with the external gear J on the slidable member 37, when the latter is moved along the reduced extension 35 of the drive shaft 33 to thereby impart rotation to the driven shaft 39 at a reduced speed with respect to the speed of the drive shaft. It will be noted that the axis of the drive shaft 33 is eccentric or off center with respect to the axis of the driven shaft 39 which makes it possible to employ external and internal meshing gears to rotate the driven shaft 39 at a reduced speed, with respect to the drive shaft 33, and in view of the great number of teeth in constant mesh or relatively so the drive is exceptionally quiet in view of the substantial elimination of any back play or back lash between the meshing gears.

The inner end of the driven shaft 39, and to the rear of the internal gear I, is rotatably supported in ball bearing 41 carried in an integral portion of the auxiliary housing 21. The provision of a bearing support at this location assures a true rotation of the internal gear I about the axis of the driven shaft 39. The description of the engagement between the external gear J on the slidable member 37 and the internal gear I on the driven shaft 39 constitutes the third speed of the transmission and also the lowest speed of the two quiet high speeds.

A rotatable cylindrical member 42 is disposed concentrically with the axis of the drive shaft 33 and encloses the slidable member 37 carried by the reduced extension 35 of the drive shaft 33, as clearly shown in Fig. 1. This rotatable member 42 is supported by a plurality of roller bearings 43 or the like interposed between the inner surface of the cylindrical member 42 and a suitable recess in the exterior surface of the slidable member 37, so that the slidable member 37 is free to rotate with the drive shaft 33 independently of the cylindrical member 42. This cylindrical member is further supported externally thereof by a ball bearing 44 fixed within a portion of the housing 20. The outer end of this cylindrical member 42, and upon the inner surface thereof, is provided with a plurality of clutch members L adapted to co-operate with the clutch members K of the slidable member 37, when the latter is moved forwardly, to thereby rotate the cylindrical member 42 simultaneously with the drive shaft 33. The rear end of the cylindrical member 42 is provided with an internal gear E of any suitable number of teeth and is adapted to constantly mesh with an external gear F on the inner end of the drive shaft 39, the number of teeth in the internal gear E being greater than the number of teeth in the external gear F so that the driven shaft 39 is rotated at a relatively greater speed than the drive shaft when the clutch members L and K are in engagement. Thus the arrangement of the gears just described constitutes the higher speed of the two quiet high speeds and the fourth speed of the transmission gearing.

At the lower portion of the transmission housing 20 and auxiliary housing 21, and extending parallel with the drive shaft 33, is a shaft 45 having its outer end suitably journaled in bearings 46 supported in the opposite ends of the housing 20 and auxiliary housing 21. This shaft 45 has keyed or otherwise secured thereto an external gear B positioned so as to be in constant mesh with the external gear A on the drive shaft 33. The shaft 45 supports a hub 47 which is prevented from relative rotation, with respect to the shaft 45, by a plurality of co-operating splines 48 but is adapted to be moved longitudinally of the shaft 45 by means which will be hereinafter described. This hub 47 is provided with an external gear C having any desired number of teeth and is adapted to engage with an external gear D having any desired number of teeth, but a greater number than the gear C, which is provided upon the inner end of the cylindrical member 42. It will, therefore, be readily apparent that to drive through the first speed of the transmission gearing the hub 47 carrying the external gear C is moved along the shaft 45 until it engages with the external gear D on the cylindrical member 42 and inasmuch as the external gear F on the driven shaft 39 is in constant mesh with the internal gear E on the cylindrical member 42 the driven shaft 39 is rotated at a reduced speed, with respect to the drive shaft 33, and this gear arrangement constitutes the first speed of the transmission gearing.

To effect a driving through the second speed of the transmission gearing the shaft 45 has keyed or otherwise secured thereto a hub 49 which is provided with an external gear G of any desired number of teeth. The driven shaft 39 supports a slidable member 50 within the auxiliary housing 21 which is prevented from relative rotation with respect to the drive shaft 39 by co-operating splines 51. The slidable member 50 carries an external gear H which has any desired number of teeth and is adapted to be moved into engagement with the external gear G on the hub 49 and when so engaged rotation is imparted to the driven shaft 39 at a reduced speed with reference to the speed of the drive shaft 33, the drive being through the external gear A, the external gear B on the shaft 45, the external gear G on the hub 49 and the external gear H on the slidable member 50 to the driven shaft 39.

When it is desired to shift into the reverse gear, the slidable member 50 is moved rearwardly and the teeth H mesh with the teeth of the gear N which is supported upon a suitable shaft journaled in the housing of the transmission and in constant mesh with the gear M.

It is, of course, necessary to provide suitable mechanism for selectively shifting these gears into proper engagement to obtain the desired speed ratios between the drive shaft 37 and the driven shaft 39 and a novel means has been worked out whereby it is possible to employ the standard arrangement for the shifting of the gears which is a considerable advantage and improvement over the general types of four speed transmissions and the system of gear shifting employed therewith.

As has been already stated, the mechanism of the transmission has been so designed that substantially the standard type of shift employed in connection with three speed transmissions can be utilized which makes this transmission particularly acceptable commercially. A horizontally disposed plate 52 is disposed between the upper flanges of the housing 20 and auxiliary housing 21 and the flanges of the cover 23, as clearly shown in Fig. 1, and is securely mounted therebetween by the customary bolts for securing the cover 23 to the transmission housing. This plate 52 is provided with a pair of spaced apertures 53 at the forward end of the plate and a pair of spaced apertures 54 at the rear portion of the plate, the apertures 53 and 54 being in longitudinal alignment. A bar 55 is adapted to slide upon the upper surface of the plate 52 and is provided with a depending leg 56 adapted to slide within the aperture 53 and limited in movement by the opposite walls of the aperture 53, the free end of this depending leg 56 extending downwardly into co-operation with a circumferentially extending groove 57 provided in a sleeve 58 telescoping the rotatable member 42 and functioning as a shifting fork. The rotatable member 42 is provided with a plurality of longitudinally extending slots or apertures 59 adapted to receive pins 60 secured in the sleeve 58 and having their free ends loosely disposed within a circumferentially extending groove 61 in the slidable member 37, so that the latter is free to rotate with the drive shaft 33 without the rotation being transmitted to the sleeve 58. The sleeve 58, however, is rotatable with the rotatable member 42, due to engagement between the pins 60 and the slots or apertures 59. The opposite end of the bar 55 is provided with a depending extension 62 so as to assist in limiting the longitudinal sliding movement of the bar 55 and is disposed within the aperture 54 in the plate 52. Extending parallel with the bar 55 is a second bar 63 having a depending leg 65 adapted to move within the other aperture 54 in the plate 52. This depending leg 65 is likewise adapted to co-operate with a circumferentially extending groove 66 provided in the slidable member 50 and functions as a shifting fork for the latter so as to move the gear H into meshing engagement with the gear G on the shaft 45, when the bar 65 is moved forwardly by the shifting lever 25. These bars 55 and 63 are provided upon their upper surfaces with a plurality of depressions 67 the central depression in each groove representing the neutral position of the transmission gearing while the two opposite depressions indicate the position of the various speeds. These bars 55 and 63 are held in either their neutral positions or in their gear selected positions by a detent 68 engaging the said depression 67 and frictionally held in engagement therewith by a spring 69 disposed within a suitable opening in the cover 23. The shifting apparatus thus far described is illustrative of the manner in which the various speed ratios are selected, this mechanism effecting the shifting of the gear mechanism into a forward reverse, a rearward second, a forward third and a rearward fourth speed of the standard H-shift arrangement.

To shift into what might be termed an auxiliary low speed in which the shifting is accomplished by a depressing of the shifting lever 25 and its movement into the normal reverse position, the plate 52 is provided with an aperture or opening 70 adjacent the end 29 of the shift lever 25 and directly beneath this opening is a slidable member 71 having an opening 72 adapted to receive the lower end 29 of the shifting lever 25. This slidable member 71 is fixedly supported on a pin or rod 73 having its outer ends slidably mounted in the housing 20 and is further provided with a depending arm 74, clearly shown in Fig. 2, having a forked end 75 adapted to co-operate with a circumferentially extending groove 76 provided in the hub 47 upon the shaft 45, so that the gear C may be moved into meshing engagement with the gear D.

Shifting into reverse gear is accomplished by a rearward movement of the bar 63 carrying the depending arm 65 which causes the slidable member 50 to move the external gear H into meshing engagement with an external gear N loosely mounted upon a shaft 77 having its free ends suitably journalled in the housing 21. This external gear N is rotated through its engagement with the external gear M on the hub 49 secured to the shaft 45 directly connected to the drive shaft 33 through the engagement of external gears A and B.

The manner of shifting into first or low gear might be objectionable in some instances and I have illustrated a modified arrangement of the transmission mechanism eliminating this first or low speed but without sacrificing any of the advantages with respect to the two quiet high speeds of the transmission and still providing a suitable low speed for all general purposes. In this modified structure there is a housing 120 and an auxiliary housing 121 the over all length of which is substantially shorter than the over all length of the transmission illustrated in Fig. 1, which is a considerable advantage in that it reduces the manufacturing cost in connection therewith and also does not consume any more space than the present type of three speed transmissions. The transmission housing is provided with a cover 123 which is bolted or otherwise secured thereto and has a tubular extension 124 formed integral therewith which is adapted to support the shifting lever 125, the latter being provided with an enlarged portion 126 fitted within the tubular extension and resting upon a bearing plate 127. The shifting lever is maintained in normal elevated position by a coil spring 128 surrounding the lower extension 129 of the shifting lever 125 and engages at one end with the bearing plate 127 and at its opposite end with an inwardly extending integral flange 130 on the tubular extension 124. The upward movement of the shifting lever 125 is limited by a cap 131 secured to the open end of the tubular extension 124 by screws 132.

The drive shaft 133 is suitably mounted in bearings 134 supported in a suitable opening in the forward end of the transmission housing 120 and is provided upon its inner end with an external gear A—A. The inner end of the drive shaft 133 is counterbored to receive the stub end 78 of an extension 135. This extension is rotated by means of co-operating splines or clutch members 79 provided upon the inner end of the drive shaft 133 and an enlarged member 80 between the stub end 78 and the extension 135, as clearly illustrated in Fig. 8. This permits true engagement between the meshing gears, inasmuch as the construction illustrated in Fig. 8 has a slightly variable rocking or pivotal movement with respect to the drive shaft 133.

The extension 135 is provided with a plurality of longitudinally extending splines 136 spaced circumferentially thereof and is adapted to support a slidable member 137 having splines 138 co-operating with the splines 136 to permit the member 137 to slide freely along the extension 135 but at the same time prevent relative rotation with respect thereto.

A driven shaft 139 is suitably supported in bearings 140 secured within a suitable opening in the auxiliary housing 121 and the axis of rotation is eccentric with respect to the axis of rotation of the drive shaft 133. The inner end of the drive shaft 139 is further supported in bearings 141 secured within an integral portion of the auxiliary housing 121 so as to assure true rotation of the inner end of the driven shaft 139. The inner end of the driven shaft 139 and beyond the bearing 141 is provided with an external gear F—F having any desired number of teeth and an internal gear I—I having any desired number of teeth, but of necessity a lesser number than in the gear F—F. The internal gear I—I is adapted to engage with the external gear J—J provided upon the rear end of the slidable member 137 so that rotation of the driven shaft is effected when the gears J—J and I—I are in mesh directly from the drive shaft 133 and at a relatively reduced speed. The engagement between the internal gear I—I and external gear J—J provides an exceptionally quiet drive, in view of the fact that a considerable number of teeth are in engagement or so closely so as to eliminate substantially any back lash or back play between meshing gears.

A rotatable member 142 surrounds the slidable member 137 and is supported upon the latter by a plurality of roller bearings 143. The rotatable member 142 is further supported in a plurality of roller bearings 144 disposed between the outer surface of the rotatable member 142 and an integral portion of the housing 120, thereby providing an efficient bearing at the rear portion of the rotatable member 142 to maintain the latter's rotation in true respect to the axis of rotation. The roller bearings 143 not only function to support the rotatable member 142 but further provide an efficient bearing for the end of the slidable member 147, when the external gear J—J is in meshing engagement with the internal gear I—I.

A shaft 145 extending parallel with the drive shaft 133 has its ends suitably journalled in bearings 136 mounted in the ends of the housing 120 and auxiliary housing 121. The shaft 145 supports a slidable hub 147 which is prevented from relative rotation with respect to the shaft 145 by cooperating splines 148. This hub 147 carries at its rearward end an external gear G—G adapted to mesh with an external gear D—D provided upon the rear portion of the rotatable member 142. The front portion of the hub 147 is provided with an external gear M—M constantly in mesh with an external gear N—N carried by the shaft 77, the outer ends of which are suitably secured in the housing 120 and auxiliary housing 121, and the shifting mechanism for slidably moving this hub 147 is so constructed that upon a rearward shifting of the hub 147 the gear M—M and the gear N—N are simultaneously carried rearwardly until the external gear N—N meshes with the external gear D—D on the rotatable member 142 to thereby rotate the driven shaft 139 in a reverse direction with respect to the drive shaft 133.

At the forward end of the shaft 145 is provided an external gear B—B constantly in mesh with the external gear A—A on the drive shaft 133.

The shifting mechanism is substantially identical in the modification with the shifting mechanism already described with respect to Fig. 1, excepting the low gear shift has been eliminated. A horizontal plate 152 is secured between the flanges of the housing 120 and auxiliary housing 121 and flanges of the cover 123. This plate, as previously described, supports a pair of bars 155 and 163 the latter only being disclosed in Fig. 7 but assuming the same relationship as in the transmission mechanism illustrated in Fig. 1.

This bar 163 is limited in its longitudinal movement upon the plate 152 by slots similar to the slots 53 and 54 of the plate 52, described in connection with the transmission mechanism illustrated in Fig. 1. At the rear portion of the bar 163 is a depending leg 165, preferably formed integral with the bar 163, and the lower end being provided with a double shifting fork 166 adapted to engage a circumferentially extending groove 167 on the hub 147 and simultaneously the other fork engages a circumferentially extending groove in a hub, not shown, provided upon the external gear N—N carried by the shaft 77. The purpose of this double shifting fork is to move the hub 147 forwardly until the external gear G—G meshes with the external gear D—D to obtain one selection of gear speeds, while moving the hub 147 in a rearward direction by the shifting fork 166 simultaneously moves the external gear N—N into engagement with the external gear D—D, and as the external gear N—N and external gear M—M are constantly in mesh reverse rotation is imparted to the driven shaft 139 with respect to the drive shaft 133. The other shifting bar 155, which is not shown in Fig. 7 but may be referred to as 55 in Fig. 3, has a depending leg at its forward end adapted to engage with the circumferentially extending groove 157 in the sleeve 158. It will, therefore, be seen that by moving the shift lever transversely or into cooperating engagement with the bar 155 the latter may be moved forwardly to thereby engage the clutch members K—K on the slidable member 137 with the clutch members L—L on the rotatable member 142, to thereby impart rotation from the drive shaft 133 to the driven shaft 139 at a relatively increased speed, through the constant meshing of the internal gear E—E of the rotatable member 144 and the external gear F—F on the driven shaft 139.

In moving the bar 155 in a rearward direction the slidable member 137, due to its engagement with the sleeve 158 through the pins 160, will be moved forwardly until the external gear J—J meshes with the internal gear I—I on the driven shaft 139 thereby imparting rotation to the driven shaft 139 from the drive shaft 133 at a relatively reduced speed.

While I have described the preferred embodiment of the invention, it should be understood that I am not limited to the precise structure disclosed herein, inasmuch as changes may be made thereto without departing from the spirit of the invention as defined in the appended claims.

Having thus described my invention, what I claim is:

1. In a transmission of the type described, a drive shaft, a slidable member rotatable with said drive shaft, an external gear carried by said slidable member, a clutch member carried by said slidable member, a second member concentric with said slidable member and provided with an internal gear at one end thereof and a clutch member at the other end, a driven shaft, an external gear thereon adapted to mesh with said internal gear, an internal gear on said driven shaft, and means for moving said slidable member whereby said external gear on said slidable member and said internal gear on said driven shaft are moved into engagement to thereby connect said drive shaft to said driven shaft so that said driven shaft is rotated at a reduced speed with respect to said drive shaft.

2. In a transmission of the type described, a housing, a drive shaft mounted in said housing, a slidable member mounted on said shaft and provided with an external gear at one end and a clutch member at the opposite end, a cylindrical member rotatably supported about said slidable member and in said housing, an internal gear on one end of said cylindrical member and a clutch member on the opposite end thereof, a driven shaft mounted in said housing, an external gear and an internal gear carried by said driven shaft, said external gear on said driven shaft being in constant mesh with said internal gear on said cylindrical member, and means for selectively moving said slidable member whereby rotation of said drive shaft may be imparted to said driven shaft through said clutch members and said constantly meshing external and internal gears, or through said external gear on said slidable member and said internal gear on said driven shaft.

3. In a transmission of the type described, a housing, a drive shaft mounted in said housing, a slidable member mounted on said shaft and provided with an external gear at one end and a clutch member at the opposite end, a cylindrical member rotatably supported about said slidable member and in said housing, an internal gear on one end of said cylindrical member and a clutch member on the opposite end thereof, a driven shaft mounted in said housing, an external gear and an internal gear carried by said driven shaft, said external gear being in constant mesh with the internal gear on said cylindrical member, and means for moving said slidable member in one direction whereby said external gear thereon will be brought into meshing engagement with said internal gear, so that said driven shaft is rotated independently of said constantly meshing gears, or in the opposite direction whereby said clutch members will be brought into meshing engagement to thereby connect said drive shaft with said driven shaft so that said driven shaft is rotated through said constantly meshing gears.

4. In a transmission of the type described, a housing, a drive shaft journalled in said housing and provided with an external gear, a slidable member mounted on said drive shaft and having an external gear on one end and a clutch member on the other end, a member rotatably mounted about said slidable member and provided with a clutch member on one end and an internal and external gear upon the other end, a driven shaft journalled in said housing and having an internal gear and an external gear upon one end, said external gear on said driven shaft and said internal gear on said member being in constant mesh, a countershaft journalled in said housing, an external gear secured to said countershaft and meshing with said external gear on said drive shaft, a second slidable member on said countershaft and having an external gear adapted to be moved into engagement with said external gear on said member, and selectively operative means for moving said slidable members whereby said driven shaft is rotated from said drive shaft through said clutch members and constantly meshing internal and external gears, or through said external gear on said slidable member and said internal gear on said driven shaft, or through said counter-shaft and said external gear on said second slidable member and said external gear on said member.

5. In a transmission of the type described, a housing, a drive shaft journalled in said housing and provided with an external gear, a slidable mounted member on said drive shaft and having an external gear on one end and a clutch member on the other end, a member rotatably mounted about said slidable member and provided with a clutch member on one end and an internal and external gear upon the other end, a driven shaft journalled in said housing and having an internal gear and an external gear upon the end thereof, said external gear on said driven shaft and said internal gear on said member being in constant mesh, a countershaft journalled in said housing, an external gear secured to said shaft and in mesh with said external gear on said drive shaft, a second slidable member on said countershaft and having an external gear adapted to be moved into engagement with said external gear on said member, and means for selectively moving said slidable members to thereby impart rotation from said drive shaft to said driven shaft through said external gear on said second slidable member and said external gear on said member and said constantly meshing internal and external gears, or through said external gear on said slidable member and said internal gear on said driven shaft, or through said clutch members and said constantly meshing internal and external gears.

6. In a transmission of the type described, a housing, a drive shaft journalled therein and provided with an extension, a slidable member rotatable with said extension, said member having a clutch member at one end and an external gear at the other, a rotatable member surrounding said slidable member and supported by the latter, said rotatable member being provided at one end with a clutch member adapted to engage with said clutch member on said slidable member and at the opposite end with an internal gear, a driven shaft journalled in said housing and provided with an internal gear adapted to mesh with said external gear on said slidable member, an external gear on said driven shaft constantly in mesh with said internal gear on said rotatable member, and means for selectively moving said slidable member whereby rotation is imparted from said drive shaft to said driven shaft at different relative speeds, one through engagement between said external gear on said slidable member and said internal gear on said driven shaft independently of said constantly meshing external and internal gears, and another through engagement between said clutch members and said constantly meshing internal and external gears.

7. In a transmission of the type described, a drive shaft, a stub shaft flexibly and non-rotatably supported in the end of the drive shaft, a slidable member on said stub shaft, an external gear on said slidable member, a driven shaft the axis of which is permanently offset and parallel with respect to the axis of said drive shaft, an internal gear on said driven shaft, and means for moving said slidable member to connect said drive shaft to said driven shaft through said external and internal gears.

8. In a transmission of the type described, a housing, a drive shaft mounted in said housing, a slidable member mounted on said shaft and provided with an external gear at one end and a clutch member at the opposite end, a cylindrical member rotatably supported about said slidable member, an internal gear on one end of said cylindrical member and a clutch member on the opposite end thereof, the inner end of the cylindrical member adjacent the clutch member having a running fit on said drive shaft, a driven shaft mounted in said housing, an external gear and an internal gear carried by said driven shaft, said external gear on said drive shaft being in constant mesh with said internal gear on said cylindrical member, and means for selectively moving said flexible member whereby rotation of said drive shaft may be imparted to said driven shaft through said clutch members and constantly meshing internal and external gears, or through said external gear on said slidable member and said internal gear on said driven shaft.

9. In gearing of the character described, a rotatable shaft having an extension constantly rotatable at the same speed, a second rotatable shaft, the axis of which is offset and parallel with respect to the axis of said first shaft, an internal gear and an external gear on said second shaft, a member rotatably supported concentrically of said first shaft and substantially encircling said extension, an internal gear at one end of said member and in constant mesh with said external gear on said second shaft, a clutch member at the other end of said member, a slidable member on said extension and non-rotatable relatively thereto, an external gear on said slidable member, a clutch member on said slidable member, and means for moving said slidable member in opposite directions whereby said external gear thereon is brought into meshing engagement with said internal gear on said second shaft or said clutch members brought into driving engagement.

In testimony whereof, I hereunto affix my signature.

JAMES P. JOHNSON.